Dec. 31, 1957 J. L. WERTZ 2,817,923
FISHING BOBBER
Filed March 7, 1955
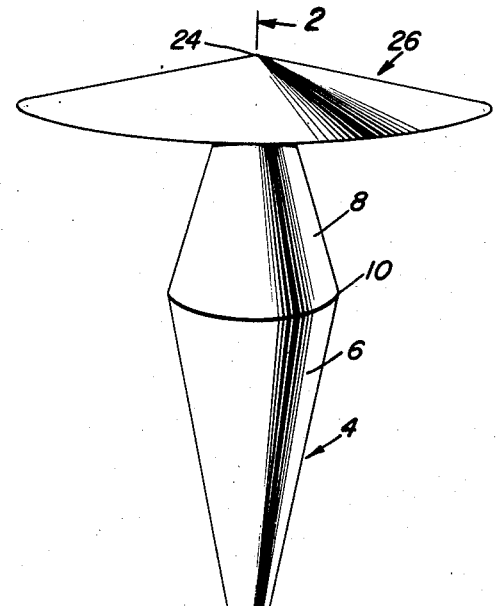
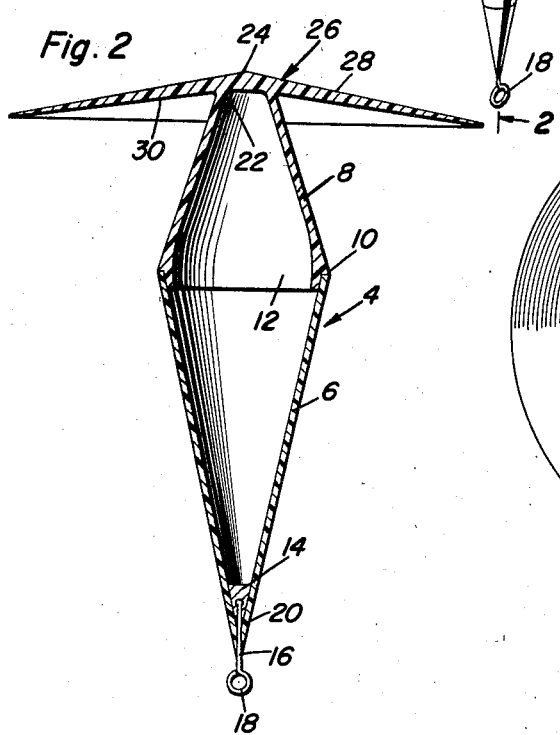
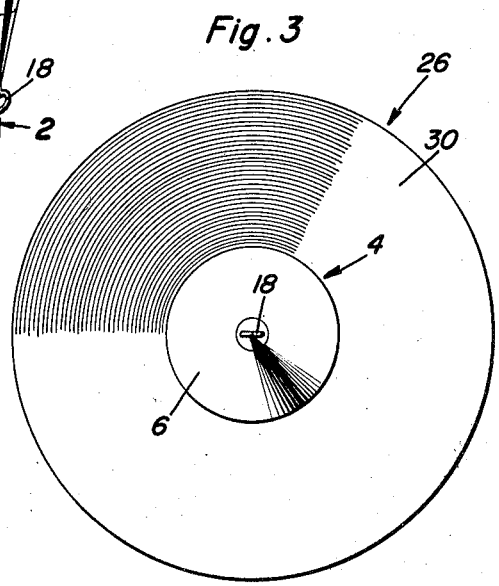
John L. Wertz
INVENTOR.

United States Patent Office 2,817,923
Patented Dec. 31, 1957

2,817,923

FISHING BOBBER

John L. Wertz, Detroit, Mich., assignor of fifty percent to Raymond E. Myers, Detroit, Mich.

Application March 7, 1955, Serial No. 492,373

1 Claim. (Cl. 43—43.1)

The present invention relates to an improved fishing bobber which is expressly and suitably designed to aid the fisherman in hooking a fish more assuredly, once the bait has been taken by the fish.

Fishing bobbers perform their functions as intended, serving primarily to signal the fisherman when he has a strike. The present invention goes a step further in that it not only signals the fisherman when a strike has been made, but aids him in hooking the fish more securely, this being accomplished by a concavo-convex canopy-like member or head which functions as a brake, checks the line and thus causes the fishhook to be effectually embedded in the mouth of the fish.

Stated otherwise, the invention has to do with a vertically elongated float which is unique in appearance and is colorful, and has an eye at the bottom to which the fishing line is attached, and an enlarged canopy-like circular concavo-convex head at the top which constitutes the aforementioned brake.

In carrying out a preferred embodiment of the invention, the float body is preferably made up of red and white complemental plastic or equivalent sections which are fused together at their cooperating ends, the upper section being attached axially or centrally to the apical concave side of the head, said head being of a diameter appreciably greater than the greatest diameter of the float so that its marginal edge portions project or radiate outwardly beyond the vertical axis of the float, all in a manner to thus provide the aforementioned hook setting brake-equipped float.

Objects, features and advantages in addition to those specifically touched upon above may become apparent from the following description and the accompanying sheet of illustrative drawings.

In the drawings:

Figure 1 is a perspective view of the improved bobber;

Figure 2 is a central vertical section on the line 2—2 of Figure 1 showing the fishing line eye in elevation; and Figure 3 is a bottom plan view.

Referring now to the drawings, the float proper is denoted by the numeral 4, and it is of vertically elongated form. Instead of having a stem with a ball-like portion on the stem, as is often customary, this particular float is hollow, and made up of appropriate commercial plastics and, more specifically, made up of a lower conical section 6 and an upper truncated conical section 8. The two sections are axially aligned, and the upper section has a shoulder 10 resting on the upper end of the lower section and an annular lip 12 which extends into the interior of the lower section and which is fused in place so that the two sections are thus unitarily connected.

In the lower apical end of the lower section, there is a limited blob or quantity of lead or the like 14 which serves as a ballast and also as an anchor medium for the stem 16 of the line eye 18. Thus, this lower end portion 20 is pointed, weighted and eye-equipped. The upper truncated end of the upper section 8, that is, the end 22, is integral with the apical or central portion 24 of the canopy-like brake forming head 26. This is also of plastic and is integral with the upper section. It is of a diameter appreciably greater than the greatest outside diameter of the float 4, and has its marginal edge projecting radially beyond the float proper in umbrella-like fashion. Being concavo-convex, the convex side 28 is disposed upwardly and the concave side 30 downwardly. When the float is mounted on the line and the fishhook (not shown) is taken, the fish takes the bait and pulls the line and bobber under the water, and the canopy-like head comes in contact with the water and acts as a brake, and thus, the hook on the line is given a satisfactory jerk and is embedded in the mouth of the fish. In actual practice, the lower conical section will be colored red, and the head and upper section colored white.

Since numerous modifications and changes will readily occur to those skilled in the art, it is not desired to limit the invention to the exact construction and operation described and shown, and accordingly all suitable modifications and equivalents may be resorted to, falling within the scope of the appended claim.

What is claimed as new is as follows:

A fishing bobber comprising a float embodying companion upper and lower hollow conical sections having their respective basal portions united and providing a double conical axially elongated float, the lower end of the lower section being internally loaded and thus weighted and having a line eye with an axial shank attached to the loading weight and extending accessibly to a position to accommodate a fishing line, and a canopy-like concavo-convex head having its concave side facing downwardly and the center part of its apical portion integrally attached to the upper apical end of the upper section of the float, said head being of circular form in plan and of a diameter appreciably greater than the greatest outside diameter of said float.

References Cited in the file of this patent

UNITED STATES PATENTS

| 240,611 | Redfield | Apr. 26, 1881 |
| 657,407 | Gibson | Sept. 4, 1900 |
| 843,946 | Howald | Feb. 12, 1907 |
| 980,667 | Owen | Jan. 3, 1911 |
| 1,112,049 | Anthony | Sept. 29, 1914 |
| 1,292,860 | Obermiller | Jan. 28, 1919 |
| 2,221,168 | Pflueger | Nov. 12, 1940 |
| 2,598,140 | Shukites | May 27, 1952 |